April 17, 1928.

B. A. HUBERT

FLOWER AND PLANT BOX

Filed June 15, 1925

1,666,240

Inventor:
Barney A. Hubert.
By
Attorney.

Patented Apr. 17, 1928.

1,666,240

UNITED STATES PATENT OFFICE.

BARNEY A. HUBERT, OF PINE LAWN, MISSOURI.

FLOWER AND PLANT BOX.

Application filed June 15, 1925. Serial No. 37,059.

My invention relates to flower and plant boxes, and it is a distinct and practical improvement to overcome certain practical objections to, and defects in, boxes for holding flowers, plants and trees.

The object of my invention is to provide a flower and plant box having inlaid mosaic side faces.

A further object of my invention is the provision of a flower and plant box which possesses advantages in points of simplicity and efficiency, and at the same time proves itself comparatively inexpensive in cost of manufacture.

With the above and other objects in view, the invention consists in the novel features of construction, arrangement and combination of parts hereinafter more fully described and finally pointed out in the claims hereto appended.

Referring to the accompanying drawings forming a part of this specification, wherein like characters of reference denote similar parts throughout the several views.

Figure 1:
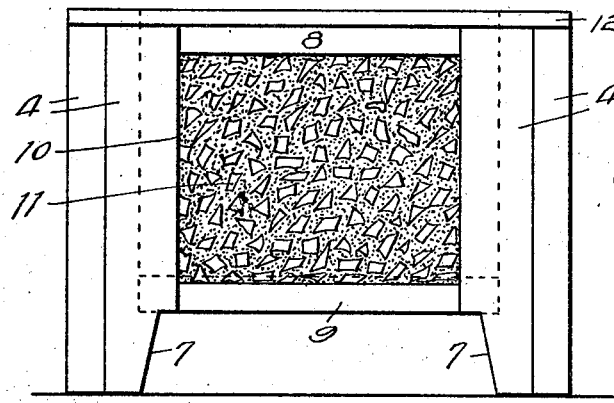
Fig. 1, is a side elevation of a flower and plant box constructed in accordance with my invention.
Figure 2:
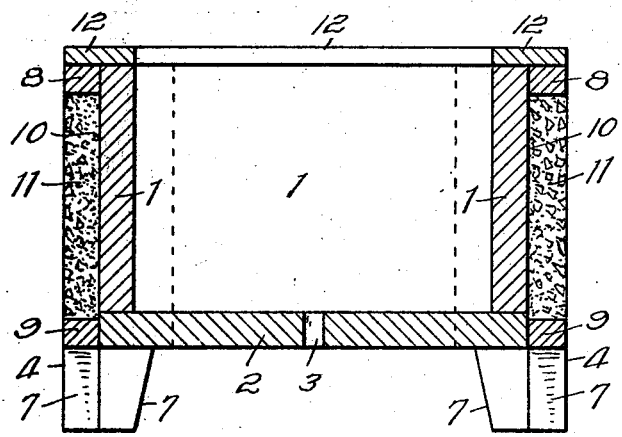
Fig. 2, is a vertical sectional elevation thereof taken on line 2—2 of Fig. 1.
Figure 3:
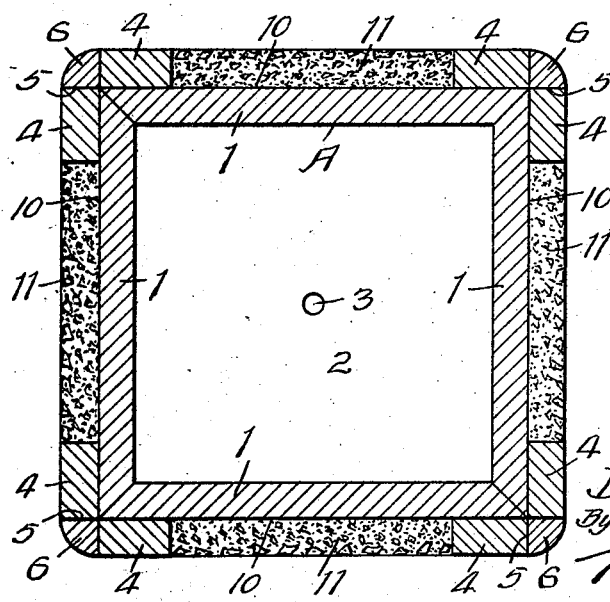
Fig. 3, is a horizontal sectional view of the flower and plant box taken on line 3—3 of Fig. 1.

In carrying out the aim of my present invention, I employ a receiving box or receptacle A consisting of four side walls 1 and the bottom or floor 2 having a central drain opening 3. The receptacle A can be made from any suitable material and can be of any depth, length and width.

A pair of suitably spaced supporting legs 4 are fixed to the outer face of each side wall 1 at the side edges thereof, with the outer side faces of the legs lying in a plane with the outer faces of the side walls 3 so as to provide a vertically disposed V-shaped pocket, or groove 5 at each corner of the box. A suitable V-shaped corner filler strip 6 is positioned in the V-shaped corner pockets, or grooves 5 and siutably fixed in position to provide a smooth round corner for the box. The supporting legs 4 extend below the bottom face of the floor 2 and have their inner side faces beveled to provide suitable feet 7 for the legs to stand upon. The corner filler strips 6 also extend to the bottom or lower face of the feet 7.

The space left between the inner side faces of each pair of supporting legs 4 is spanned at the top by means of a narrow marginal strip 8 fixed to the outer face of the box A, the upper face of which strip lies in a plane with the upper face of the side walls 1, the upper faces of the legs 4 and the upper faces of the corner filler strips 6. A second narrow marginal strip 9 is fixed to the outer face of the box A at the bottom edge thereof. This arrangement of legs 6 and marginal strip 9 provide a shallow facial depression or pocket 10, which is filled with a suitable adhesive plastic material to provide an inlaid mosaic face or panel 11 which may be of any suitable facial design, as is manifest.

The top faces of the side walls 1, the legs 4, the narrow marginal strips 8 and the corner filler strips 6 are covered by means of four top facing strips 12.

The many advantages of the herein described invention will readily suggest themselves to those skilled in the art to which it appertains.

I do not wish to be understood as having limited myself to the specific details of construction shown and described, but desire to have it understood that the invention I have shown in the drawings is merely illustrative, as it is manifest that various minor changes may be made in the exact construction and particular arrangement of parts without departing from the spirit of my invention, hence I reserve the right to make any such changes, or modifications, as may fairly fall within the scope of the appended claims when fairly construed.

What I claim is:

A flower and plant box comprising four side walls, a bottom member provided with a drain opening, a pair of supporting legs fixed to each corner of the box terminating at their lower ends in feet below the lower plane of the bottom member with the outer side faces of the legs and feet forming a vertically disposed V-shaped groove in plan view, which groove extends from the top face of the box to the lower face of each pair of feet, a filler strip receivable in each of the vertically disposed grooves and extending from the top face of the box to the lower face of the feet, a narrow marginal strip and a second narrow marginal strip fixed to each side wall between the supporting legs to provide a facial depression for each side wall, a mosaic panel disposed in each facial depression with its outer face substantially flush with the outer faces of the supporting legs, the marginal strips, and the second marginal strips; and facing strips covering the upper faces of the side walls, supporting legs, corner filler strips and the first-mentioned marginal strips.

In testimony whereof, I have hereunto signed my name to the specification.

BARNEY A. HUBERT.